United States Patent
Zaenal et al.

(10) Patent No.: US 12,234,563 B2
(45) Date of Patent: Feb. 25, 2025

(54) METHOD FOR MANUFACTURING ELECTRODE, AND ELECTRODE

(71) Applicant: DE NORA PERMELEC LTD, Fujisawa (JP)

(72) Inventors: Awaludin Zaenal, Fujisawa (JP); Akihiro Kato, Fujisawa (JP); Takaaki Nakai, Fujisawa (JP); Osamu Arimoto, Fujisawa (JP); Akihiro Madono, Fujisawa (JP); Sayaka Fukuda, Fujisawa (JP)

(73) Assignee: DE NORA PERMELEC LTD, Fujisawa (JP)

( * ) Notice: Subject to any disclaimer, the term of this patent is extended or adjusted under 35 U.S.C. 154(b) by 0 days.

(21) Appl. No.: 18/569,324

(22) PCT Filed: Jul. 1, 2022

(86) PCT No.: PCT/JP2022/026487
§ 371 (c)(1),
(2) Date: Dec. 12, 2023

(87) PCT Pub. No.: WO2023/286641
PCT Pub. Date: Jan. 19, 2023

(65) Prior Publication Data
US 2024/0263327 A1    Aug. 8, 2024

(30) Foreign Application Priority Data

Jul. 12, 2021   (JP) ................................. 2021-115095

(51) Int. Cl.
*C25B 11/061*   (2021.01)
*C21D 6/00*     (2006.01)
(Continued)

(52) U.S. Cl.
CPC ............ *C25B 11/061* (2021.01); *C21D 6/001* (2013.01); *C22F 1/10* (2013.01); *C23F 1/16* (2013.01); *C23F 17/00* (2013.01); *C25B 1/04* (2013.01)

(58) Field of Classification Search
CPC ......... C25B 11/061; C25B 1/04; C21D 6/001; C22F 1/10; C23F 1/16; C23F 17/00
(Continued)

(56) References Cited

U.S. PATENT DOCUMENTS

| | | | |
|---|---|---|---|
| 2005/0194066 A1* | 9/2005 | Duruz | ...................... C25C 3/12 |
| | | | 205/385 |
| 2016/0237578 A1 | 8/2016 | Ichikawa et al. | |

(Continued)

FOREIGN PATENT DOCUMENTS

| CA | 2 849 983 | * 4/2013 | ............... C09D 5/08 |
|---|---|---|---|
| CN | 111108233 | 5/2020 | |

(Continued)

OTHER PUBLICATIONS

International Search report issued for PCT/JP2022/026487, dated Aug. 30, 2022, 5 pages, with English translation.

(Continued)

*Primary Examiner* — Duy Vu N Deo
(74) *Attorney, Agent, or Firm* — HSML P.C.

(57) ABSTRACT

The present invention provides a simple method for producing an electrode having improved oxygen evolution reaction (OER) activity without a need for catalyst coating and an electrode produced by this production method. The method is a method for producing an electrode including a step of subjecting an electrically conductive substrate comprising a nickel alloy comprising 30 to 70% by mass of Ni and 30 to 70% by mass of Fe, provided that Ni+Fi=100% by mass, to a thermal treatment, and a step of etching the thermally treated electrically conductive substrate with an etchant comprising at least any acid of an organic acid and a weak inorganic acid. The electrode is an electrode that is produced by this production method and that is useful as an oxygen evolution anode or the like.

7 Claims, 4 Drawing Sheets

(51) Int. Cl.
*C22F 1/10* (2006.01)
*C23F 1/16* (2006.01)
*C23F 17/00* (2006.01)
*C25B 1/04* (2021.01)

(58) Field of Classification Search
USPC .......................................................... 216/55
See application file for complete search history.

(56) References Cited

U.S. PATENT DOCUMENTS

| | | |
|---|---|---|
| 2016/0372276 A1 | 12/2016 | Han et al. |
| 2019/0078220 A1* | 3/2019 | Kato .................... C25B 9/00 |
| 2019/0226102 A1 | 7/2019 | Mitsushima et al. |
| 2020/0248323 A1 | 8/2020 | Bishwas |
| 2020/0291536 A1 | 9/2020 | Peng et al. |

FOREIGN PATENT DOCUMENTS

| | | |
|---|---|---|
| JP | S6196088 A * | 10/1986 |
| JP | 2017-190476 | 10/2017 |
| WO | 2015/064644 | 5/2015 |
| WO | 2018/047961 | 3/2018 |

OTHER PUBLICATIONS

First Chinese Office Action, issued in the corresponding Chinese patent application No. 202280047675.4, dated Apr. 23, 2024, 13 pages with machine translation other than search report.

Extended European Search Report, issued in the corresponding European patent application No. 22841985.9, dated Aug. 5, 2024, 7 pages.

* cited by examiner

[Figure 1A]
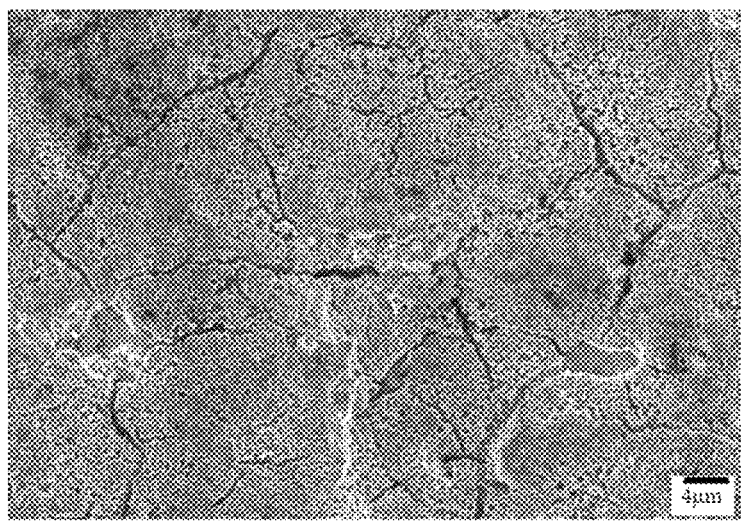
[Figure 1B]
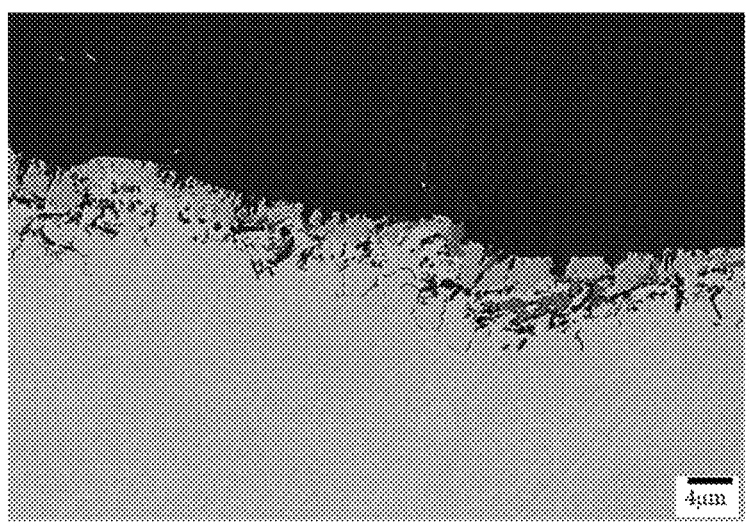

[Figure 2A]
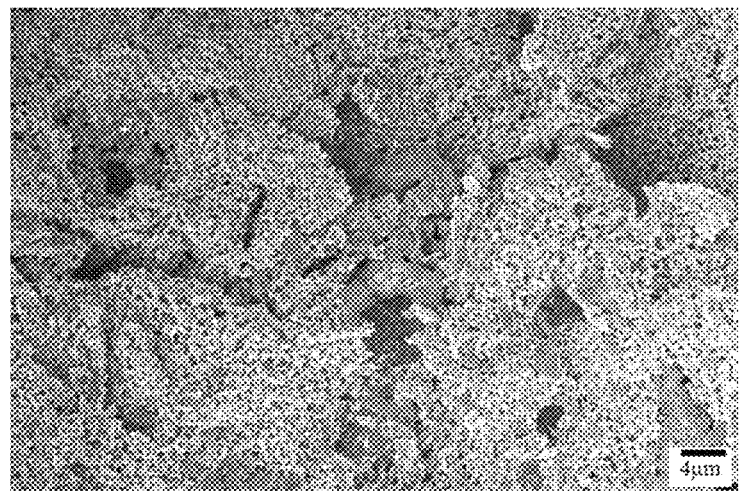

[Figure 2B]
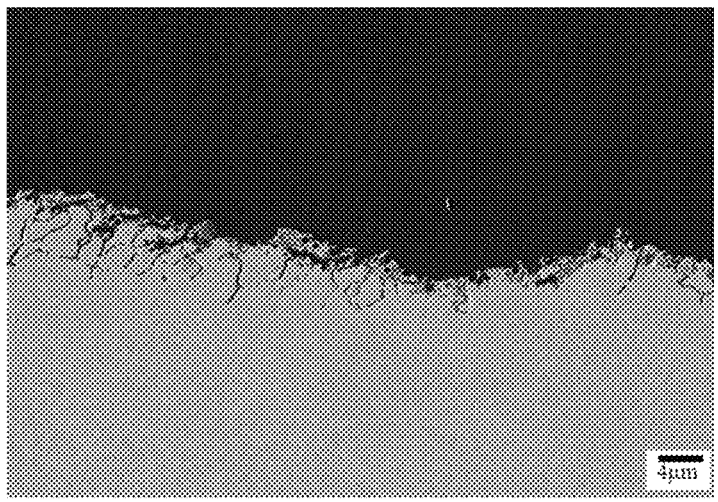
[Figure 3A]
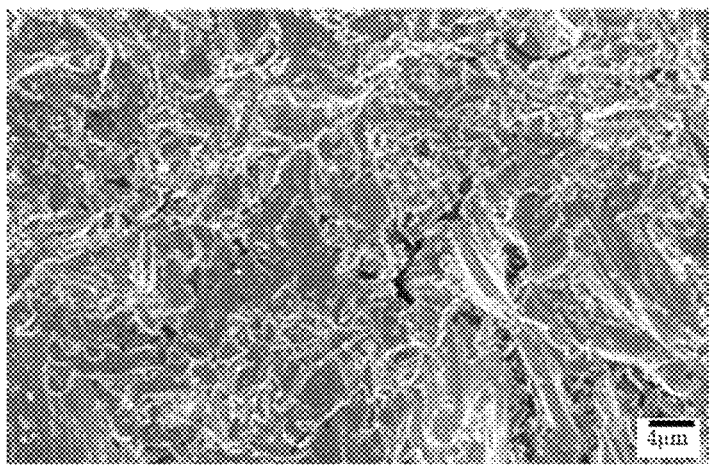
[Figure 3B]

[Figure 4A]
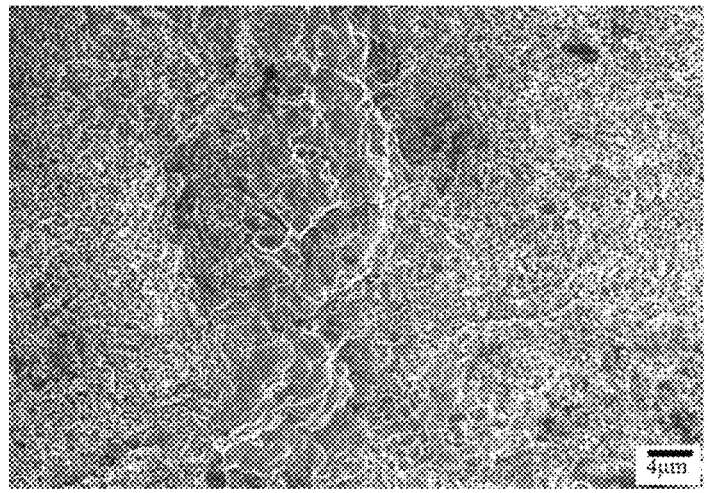
[Figure 4B]
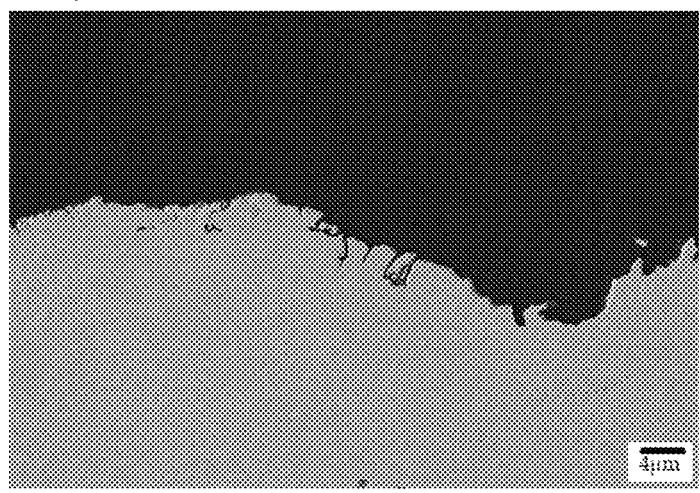
[Figure 5]
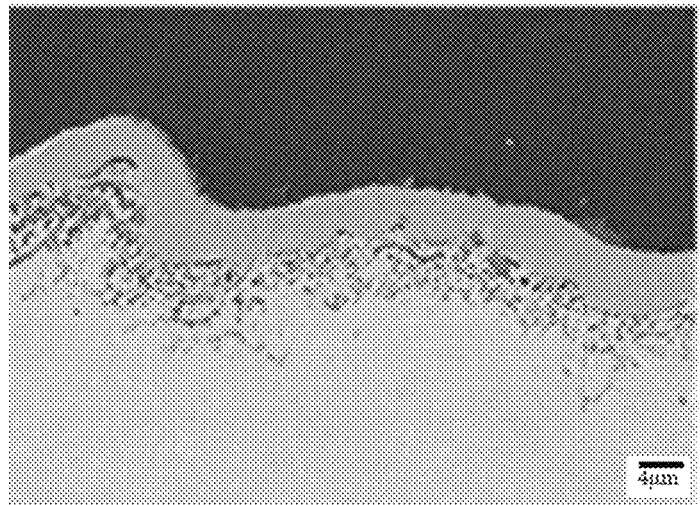

METHOD FOR MANUFACTURING ELECTRODE, AND ELECTRODE

TECHNICAL FIELD

The present invention relates to a method for producing an electrode, and an electrode produced by the method for producing an electrode.

BACKGROUND ART

A water electrolysis technique is low cost, suitable for enlargement of scale, and therefore is a predominant technique for hydrogen production. Among the elements which are used for water electrolysis, many of anodes have an oxygen evolution overpotential of exceeding 0.3 V under actual operation conditions. It can be said that there is room for significant improvement in the oxygen evolution overpotential as compared to the fact that hydrogen evolution and chlorine evolution overpotentials utilized in current electrolysis industry are around 0.1 V.

For example, as an alkaline water electrolysis anode, an electrode formed by a nickel alloy or the like that is stable in a high-concentration alkali aqueous solution, an electrode using this electrode as an electrically conductive substrate and having a catalyst layer or the like provided on a surface of the electrode, or the like is used.

To make an electrically conductive substrate composed of a nickel alloy into an electrode, an etching treatment for example is performed using an etchant in order to remove a components such as an organic material adhering to the surface or to improve adhesiveness with a catalyst layer. Specifically, a method of immersing an electrically conductive substrate composed of a nickel alloy in boiling hydrochloric acid to perform an etching treatment is known (Patent Literatures 1 and 2).

CITATION LIST

Patent Literature

Patent Literature 1: Japanese Patent Laid-Open No. 2017-190476
Patent Literature 2: International Publication No. WO 2018/047961

SUMMARY OF INVENTION

Technical Problem

However, oxygen evolution reaction (OER) activity of an electrode obtained by an etching treatment according to any of the methods disclosed in Patent Literatures 1 and 2, and the like is not so high, and there has been room for further improvements.

The present invention has been completed in view of such problems of the conventional techniques, and an object of the present invention is to provide a simple method for producing an electrode having improved oxygen evolution reaction (OER) activity without a need for catalyst coating. In addition, another object of the present invention is to provide an electrode produced by the above-described production method and suitable as an oxygen evolution anode or the like.

Solution to Problem

That is, according to the present invention, a method for producing an electrode, described below, is provided.

[1] A method for producing an electrode, including: a step of subjecting an electrically conductive substrate composed of a nickel alloy containing 30 to 70% by mass of Ni and 30 to 70% by mass of Fe, provided that Ni+Fi=100% by mass, to a thermal treatment; and a step of etching the thermally treated electrically conductive substrate with an etchant containing at least any acid of an organic acid and a weak inorganic acid.

[2] The method for producing an electrode according to [1], wherein the organic acid is acetic acid, and the weak inorganic acid is boric acid.

[3] The method for producing an electrode according to [1] or [2], further including a step of subjecting a surface of the electrically conductive substrate before being subjected to the thermal treatment to blasting.

[4] The method for producing an electrode according to any one of [1] to [3], wherein the nickel alloy contains 40 to 60% by mass of Ni and 40 to 60% by mass of Fe, provided that Ni+Fe=100% by mass.

[5] The method for producing an electrode according to any one of [1] to [4], further including a step of providing a catalyst layer on the surface of the etched electrically conductive substrate.

[6] The method for producing an electrode according to [5], further including a step of providing an intermediate layer between the surface of the etched electrically conductive substrate and the catalyst layer.

[7] The method for producing an electrolysis electrode according to any one of [1] to [6], wherein the electrode is an oxygen evolution anode.

In addition, according to the present invention, an electrode described below is provided.

[8] An electrode produced by the production method according to any one of [1] to [7].

Advantageous Effects of Invention

The present invention can provide a simple method for producing an electrode having improved oxygen evolution reaction (OER) activity without a need for catalyst coating. In addition, the present invention can provide an electrode produced by the above-described production method and suitable as an oxygen evolution anode or the like.

BRIEF DESCRIPTION OF DRAWINGS

FIG. 1A is an electron micrograph of a surface of an electrode produced in Example 1.

FIG. 1B is an electron micrograph of a section of the electrode produced in Example 1.

FIG. 2A is an electron micrograph of a surface of an electrode produced in Example 2.

FIG. 2B is an electron micrograph of a section of the electrode produced in Example 2.

FIG. 3A is an electron micrograph of a surface of an electrode produced in Comparative Example 2.

FIG. 3B is an electron micrograph of a section of the electrode produced in Comparative Example 2.

FIG. 4A is an electron micrograph of a surface of an electrode produced in Comparative Example 8.

FIG. 4B is an electron micrograph of a section of the electrode produced in Comparative Example 8.

FIG. 5 is an electron micrograph of a section of an electrode produced in Comparative Example 5.

DESCRIPTION OF EMBODIMENTS

<Method for Producing Electrode>

Hereinafter, embodiments of the present invention will be described, but the present invention is not limited to the following embodiments. A method for producing an electrode of the present invention (hereinafter, also simply referred to as "production method (of the present invention)") includes a step (thermal treatment step) of subjecting an electrically conductive substrate composed of a nickel alloy to a thermal treatment; and a step (etching step) of etching the thermally treated electrically conductive substrate with an etchant. The nickel alloy that forms the electrically conductive substrate contains 30 to 70% by mass of Ni and 30 to 70% by mass of Fe (provided that Ni+Fe=100% by mass). The etchant contains at least any acid of an organic acid and a weak inorganic acid. Hereinafter, details on the method for producing an electrode of the present invention will be described.

(Thermal Treatment Step)

In the thermal treatment step, the electrically conductive substrate composed of a nickel alloy is subjected to a thermal treatment. When the electrically conductive substrate is subjected to the thermal treatment, iron (Fe) in the nickel alloy that forms the electrically conductive substrate migrates to the surface of the electrically conductive substrate and a surface layer containing Fe as the main component is formed (FIG. 5). The temperature of the thermal treatment is preferably set to 500 to 600° C., more preferably 520 to 580° C. By performing the thermal treatment at the temperature within the above-described range, a sufficient surface layer containing Fe as the main component can be formed. The time for the thermal treatment may appropriately be set according to the shape, thickness, and the like of the electrically conductive substrate. Specifically, the time for the thermal treatment may be set within about 1 to about 5 hours.

The nickel alloy that forms the electrically conductive substrate contains 30 to 70% by mass of nickel (Ni) and 30 to 70% by mass of iron (Fe), preferably 40 to 60% by mass of Ni and 40 to 60% by mass of Fe. Provided that the total of Ni and Fe is 100% by mass. In addition, trace elements such as manganese (Mn), chromium (Cr), and carbon (C) besides Ni and Fe may be contained in the nickel alloy. By using the electrically conductive substrate formed with the nickel alloy in which the contents of Ni and Fe are within the above-described ranges, an electrode having improved oxygen evolution reaction (OER) activity can be produced. Specific examples of the nickel alloy include Invar 42 and Invar 36.

The electrically conductive substrate is an electric conductor that conducts electricity for electrolysis. When an intermediate layer and a catalyst layer are provided on a surface of the electrically conductive substrate, the electrically conductive substrate functions as a carrier that carries the intermediate layer and the catalyst layer. The whole of the electrically conductive substrate may be formed with a nickel alloy, or only the surface of the electrically conductive substrate may be formed with a nickel alloy. The thickness of the electrically conductive substrate is preferably 0.05 to 5 mm. The shape of the electrically conductive substrate is preferably a shape having an opening for removing bubbles of oxygen, hydrogen, and the like to be produced. For example, an expanded mesh or a porous expanded mesh can be used as the electrically conductive substrate. When the electrically conductive substrate has a shape having an opening, the aperture ratio of the electrically conductive substrate is preferably 10 to 95%.

(Etching Step)

In the etching step, the thermally treated electrically conductive substrate is etched with the etchant. The etchant is a liquid (aqueous solution) containing at least any acid of an organic acid and boric acid. When the electrically conductive after substrate the thermal treatment is etched with this etchant, at least a part of the surface layer formed by the thermal treatment and containing Fe as the main component can be removed. Thereby, an electrode having a newly formed porous surface containing Ni as the main component can be obtained (FIG. 1B).

The electrically conductive substrate can be etched by, for example, immersing the thermally treated electrically conductive substrate in the etchant. The temperature of the etchant may be room temperature (20° C.) or higher, and is preferably set to 50° C. or higher, and the electrically conductive substrate is more preferably immersed in the etchant which is boiling. When etching is performed using the etchant at a predetermined temperature or higher, thereby at least a part of the surface layer containing Fe as the main component can be removed more efficiently. The time for immersing the electrically conductive substrate in the etchant may appropriately be set according to the shape, thickness, and the like of the electrically conductive substrate. Specifically, the time for immersing the electrically conductive substrate in the etchant may be set within a range of about 0.1 to about 10 hours.

The acid contained in the etchant is at least any of an organic acid and a weak inorganic acid. When etching is performed using the etchant containing any of these acids, thereby at least a part of the surface layer containing Fe as the main component can efficiently be removed and an electrode having a newly formed porous surface containing Ni as the main component can be obtained (FIG. 1B). When etching is performed using an etchant containing a so-called strong acid such as hydrochloric acid (HCl) instead of an organic acid and a weak inorganic acid, a porous surface cannot be formed (FIG. 4B), and an electrode having improved oxygen evolution reaction (OER) activity cannot be produced.

As the organic acid, formic acid, acetic acid, propionic acid, oxalic acid, citric acid, and the like can be used. Among others, acetic acid is preferably used as the organic acid. The weak inorganic acid is an inorganic acid such that only some parts thereof are dissociated when dissolved in water. The weak inorganic acid preferably has a pKa of 2.0 to 10 in water at 25° C. Examples of the weak inorganic acid include boric acid, phosphoric acid, hydrofluoric acid, and hypochlorous acid. Among others, boric acid is preferably used as the weak inorganic acid. The content (concentration) of the acid in the etchant may appropriately be set according to the shape, thickness, and the like of the electrically conductive substrate. Specifically, the content (concentration) of the acid in the etchant is preferably set to 5 to 75% by mass, more preferably 7.5 to 60% by mass. In addition, the consumption of the electrically conductive substrate by etching is preferably set to about 1 to about 50 g/m².

(Blast Step)

The production method of the present invention preferably further includes a step (blast step) of subjecting the surface of the electrically conductive substrate before being subjected to the thermal treatment to blasting. When the thermal treatment is performed after roughening the surface of the electrically conductive substrate by blasting, thereby in the case where an intermediate layer and a catalyst layer are to be provided after the roughening, the adhesiveness of these layers to the surface of the electrically conductive substrate can be improved. Examples of methods of subjecting the surface of the electrically conductive substrate to blasting include a method of spraying abrasive grains of an alumina powder or the like.

(Step of Forming Catalyst Layer)

The production method of the present invention preferably further includes a step of providing a catalyst layer on the surface of the etched electrically conductive substrate. Examples of the catalyst that forms the catalyst layer include platinum, a ruthenium oxide, an iridium oxide, a rhodium oxide, and a palladium oxide corresponding to various kinds of electrolysis. In the case of an oxygen evolution electrode for which durability against evolved oxygen, low pH, organic impurities, and the like are particularly required, an iridium oxide is suitable. Further, in order to improve adhesiveness with the electrically conductive substrate and the intermediate layer or durability against electrolysis, a titanium oxide, a tantalum oxide, a niobium oxide, a tin oxide or the like is preferably mixed in the catalyst. The catalyst layer can be formed by a chemical solution deposition method, a sol-gel method, a paste method, electrophoresis, a CVD method, a PVD method, and the like. Among others, a chemical solution deposition method disclosed in Japanese Patent Publication No. 48-3954, Japanese Patent Publication No. 46-21884, and the like, is preferable, wherein a coating solution containing a metal compound to be the main component of a catalyst layer is coated and dried, and then a heating and calcining treatment is performed to produce an intended oxide (catalyst) through thermal and decomposition thermal synthesis reaction.

Examples of the metal compound contained in the coating solution include a metal alkoxide, a metal chloride, and a metal nitrate. To the coating solution, hydrochloric acid, nitric acid, oxalic acid, and as a chelating agent, salicylic acid, 2-ethylhexanoic acid, acethyl acetone, EDTA, ethanolamine, citric acid, and ethylene glycol and the like as a stabilizer may be added. The coating solution is coated on the surface of the electrically conductive substrate or the intermediate layer by a coating method such as brush coating, roller coating, spray coating, spin coating, printing, or electrostatic coating, and then dried. Subsequently, the heating and calcination treatment is performed in an oxidative atmosphere such as air, and thereby the catalyst layer can be formed. The thickness of the catalyst layer is preferably, for example, 0.01 to 100 μm, more preferably 0.1 to 10 μm.

(Step of Forming Intermediate Layer)

The production method of the present invention preferably further includes a step of providing an intermediate layer between the surface of the etched electrically conductive substrate and the catalyst layer. When the intermediate layer is provided, thereby adhesion force between the surface of the electrically conductive substrate and the catalyst layer can further be enhanced. The intermediate layer can be formed by the same method as the above-described method for forming the catalyst layer. Among others, the intermediate layer is preferably provided between the surface of the etched electrically conductive substrate and the catalyst layer by the above-described chemical solution deposition method. The thickness of the intermediate layer is preferably, for example, 0.01 to 100 μm, more preferably 0.1 to 10 μm.

<Electrode>

An electrode of the present invention is one produced by the above-described method for producing an electrode. That is, the electrode of the present invention is an electrode obtained by subjecting the electrically conductive substrate composed of a nickel alloy containing Ni and Fe in a predetermined ratio to thermal treatment and then etching the thermally treated electrically conductive substrate with an etchant containing a particular acid. As described above, if necessary, the intermediate layer and the catalyst layer may be provided on the surface of the electrically conductive substrate. The electrode of the present invention is obtained by the above-described production method, and therefore oxygen evolution reaction (OER) activity is improved without a need for catalyst coating. For this reason, the electrode of the present invention is suitable as, for example, an oxygen evolution anode.

EXAMPLES

Hereinafter, the present invention will specifically be described based on Examples, but the present invention is not limited to these Examples. Note that "parts" and "%" in Examples and Comparative Examples are on a mass basis unless otherwise noted.

<Production (1) of Electrode>

Example 1

An electrically conductive substrate (thickness: 1 mm) formed with a nickel alloy (Invar 42 (Ni 42%, Fe 58%)) was prepared. This electrically conductive substrate was subjected to a blast treatment (0.3 MPa) with alumina particles of 60 mesh and then subjected to a thermal treatment at 530° C. for 3 hours in an air environment. The electrically conductive substrate was left standing to cool and then subjected to an etching treatment by being immersed in a 10% boiling boric acid aqueous solution for 20 minutes. The etched electrically conductive substrate was left standing to cool and then rinsed with water and dried to obtain an electrode. The consumption by the etching treatment was 17.0±2.1 g/m$^2$.

Comparative Examples 1 to 5

Each electrode was produced in the same manner as in Example 1 described above except that an electrically conductive substrate composed of each material shown in Table 1 and each treatment shown in Table 1 was performed. The consumption (g/m$^2$) by each etching treatment is shown in Table 1.

<Measurement (1) of Oxygen Overpotential>

Electrolytic cells were prepared using the produced electrodes as anodes and using nickel cathodes. The area of each electrode was set to 4 cm$^2$. Electrolysis was performed using an electrolyte (30% KOH aqueous solution) at a current density of 10 kA/m$^2$ for 2 hours to measure oxygen overpotential (mV). Measurement results are shown in Table 1.

TABLE 1

| | Electrically conductive substrate | Blast treatment | Thermal treatment | Etching treatment | Consumption (g/m$^2$) by etching treatment | Oxygen overpotential (mV) |
|---|---|---|---|---|---|---|
| Example 1 | Invar 42 | Performed | Performed | 10% boiling boric acid aqueous solution × 20 min | 17.0 ± 2.1 | 197 |
| Comparative Example 1 | Nickel | Performed | Not performed | Not performed | — | 342 |
| Comparative Example 2 | Invar 42 | Performed | Not performed | Not performed | — | 257 |
| Comparative Example 3 | Invar 42 | Performed | Not performed | 10% boiling acetic acid aqueous solution × 20 min | 17.2 ± 1.4 | 246 |
| Comparative Example 4 | Invar 42 | Performed | Not performed | 10% acetic acid aqueous solution × ultrasonic waves × 30 min (room temperature) | 3.2 ± 1.7 | 224 |
| Comparative Example 5 | Invar 42 | Performed | Performed | Not performed | — | N.D. |

<Production (2) of Electrode>

Example 2

An electrically conductive substrate (thickness: 1 mm) formed with a nickel alloy (Invar 42 (Ni 42%, Fe 58%)) was prepared. This electrically conductive substrate was subjected to a blast treatment (0.3 MPa) with alumina particles of 60 mesh and then subjected to a thermal treatment at 530° C. for 3 hours in an air environment. The electrically conductive substrate was left standing to cool and then subjected to an etching treatment by being immersed in a 10% boiling acetic acid aqueous solution for 20 minutes. The etched electrically conductive substrate was left standing to cool and then rinsed with water and dried to obtain an electrode.

Comparative Examples 6 and 7

Each electrode was produced in the same manner as in Example 2 described above except that an electrically conductive substrate composed of a material (Permalloy 78 (Ni 78%, Fe 22%)) shown in Table 2 was used and each treatment shown in Table 2 was performed.

<Measurement (2) of Oxygen Overpotential>

Oxygen overpotential (mV) was measured in the same manner as in "Measurement (1) of Oxygen Overpotential" described above. Measurement results are shown in Table 2 together with measurement results for the electrodes produced in Comparative Examples 1 and 2.

<Production (3) of Electrode>

Comparative Example 8

An electrically conductive substrate (thickness: 1 mm) formed with a nickel alloy (Invar 42 (Ni 42%, Fe 58%)) was prepared. This electrically conductive substrate was subjected to a blast treatment (0.3 MPa) with alumina particles of 60 mesh and then subjected to a thermal treatment at 530° C. for 3 hours in an air environment. The electrically conductive substrate was left standing to cool and then subjected to an etching treatment by being immersed in a 10% boiling hydrochloric acid for 3 minutes. The etched electrically conductive substrate was left standing to cool and then rinsed with water and dried to obtain an electrode.

<Electron Micrographs of Electrodes>

Electron micrographs of the surfaces and sections of respective electrodes produced in Examples 1 and 2, Comparative Example 2, and Comparative Example 8 are shown in FIGS. 1A to 4B. In addition, an electron micrograph of a section of the electrode produced in Comparative Example 5 is shown in FIG. 5.

As shown in FIG. 5, it is understood that when the electrically conductive substrate is subjected to the thermal treatment, thereby Fe in the nickel alloy (Invar 48) migrates to form a surface layer.

As shown in FIGS. 1A to 2B, when the electrically conductive substrate after the thermal treatment was subjected to an etching treatment with a boric acid aqueous

TABLE 2

| | Electrically conductive substrate | Blast treatment | Thermal treatment | Etching treatment | Oxygen overpotential (mV) |
|---|---|---|---|---|---|
| Example 2 | Invar 42 | Performed | Performed | 10% boiling acetic acid aqueous solution × 20 min | 201 |
| Comparative Example 1 | Nickel | Performed | Not performed | Not performed | 342 |
| Comparative Example 2 | Invar 42 | Performed | Not performed | Not performed | 257 |
| Comparative Example 6 | Permalloy 78 | Performed | Not performed | Not performed | 280 |
| Comparative Example 7 | Permalloy 78 | Performed | Performed | 10% boiling acetic acid aqueous solution × 20 min | 298 | solution or an acetic acid aqueous solution, thereby an electrode on which a surface having a porous structure is formed can be obtained. In contrast, as shown in FIGS. 3A and 3B, by only subjecting the electrically conductive substrate to a blast treatment, a surface having a porous structure as shown in FIGS. 1A to 2B cannot be formed. Further, as shown in FIGS. 4A and 4B, it is understood that when the electrically conductive substrate after the thermal treatment is subjected to an etching treatment with hydrochloric acid, a surface having a porous structure as shown in FIGS. 1A and 2B cannot be formed.

INDUSTRIAL APPLICABILITY

An electrode produced by the production method of the present invention is suitable as, for example, an oxygen evolution anode.

The invention claimed is:

1. A method for producing an oxygen generation anode for water electrolysis, comprising:
thermally treating an electrically conductive substrate comprising a nickel alloy comprising Ni in a range from 30 to 70% by mass, and Fe in a range from 30 to 70% by mass, relative to a total of Ni and Fe as 100% by mass, at a temperature in a range from 500 to 600° C., thereby a surface layer comprising Fe as a main component being formed; and
etching the thermally treated electrically conductive substrate with an etchant comprising an organic acid and a weak inorganic acid so that the surface layer is at least partially removed, thereby the anode having an at least partially porous surface comprising Ni as a main component being obtained in an area of the surface layer where the surface layer has been partially removed by the etching with the etchant.

2. The method for producing an oxygen generation anode for water electrolysis according to claim 1, wherein
the organic acid is acetic acid, and
the weak inorganic acid is boric acid.

3. The method for producing an oxygen generation anode for water electrolysis according to claim 1, further comprising blasting a surface of the electrically conductive substrate before the thermal treating.

4. The method for producing an oxygen generation anode for water electrolysis according to claim 1, wherein the nickel alloy comprises Ni in a range from 40 to 60% by mass, and Fe in a range from 40 to 60% by mass relative to the total of Ni and Fe as 100% by mass.

5. The method for producing an oxygen generation anode for water electrolysis according to claim 1, further comprising providing a catalyst layer on the at least partially porous surface of the etched electrically conductive substrate.

6. The method for producing an oxygen generation anode for water electrolysis according to claim 5, further comprising providing an intermediate layer between the at least partially porous surface of the etched electrically conductive substrate and the catalyst layer.

7. The method for producing an oxygen generation anode for water electrolysis according to claim 1,
wherein in the etching, the surface layer of the thermally treated electrically conductive substrate is partially removed, thereby anode having a partially porous surface comprising Ni as a main component is obtained.

* * * * *